(12) United States Patent
Benning

(10) Patent No.: US 6,750,922 B1
(45) Date of Patent: Jun. 15, 2004

(54) SCREEN PROTECTOR

(76) Inventor: James M. Benning, 1857 Tilton Dr., Pittsburgh, PA (US) 15241

( * ) Notice: Subject to any disclaimer, the term of this patent is extended or adjusted under 35 U.S.C. 154(b) by 563 days.

(21) Appl. No.: 09/666,512

(22) Filed: Sep. 20, 2000

(51) Int. Cl.[7] .............................. H04N 5/65; H04N 5/72
(52) U.S. Cl. ..................... 348/818; 348/823; 348/834
(58) Field of Search ........................... 348/818, 823, 348/834, 836; 359/451; 128/849; 29/525.01

(56) References Cited

U.S. PATENT DOCUMENTS

| | | | |
|---|---|---|---|
| 4,907,090 A | * | 3/1990 | Ananian ..................... 348/823 |
| 5,400,177 A | * | 3/1995 | Petitto et al. ................ 359/451 |
| 5,429,142 A | * | 7/1995 | Szabo et al. ................ 128/849 |
| RE35,318 E | | 8/1996 | Warman |
| 5,592,241 A | * | 1/1997 | Kita et al. ................... 348/823 |
| 6,125,525 A | * | 10/2000 | Brock ...................... 29/525.01 |
| 6,377,320 B1 | * | 4/2002 | Ananian et al. ............ 348/836 |
| 6,469,752 B1 | * | 10/2002 | Ishikawa et al. ............ 348/834 |

* cited by examiner

Primary Examiner—Chris Kelley
Assistant Examiner—Allen Wong
(74) Attorney, Agent, or Firm—David W. Brownlee

(57) ABSTRACT

A frameless substantially transparent protector screen for disposition recessed in an opening in the housing on an electronic device with the protector screen spaced from a video display screen in the device. The protector is removably secured to the frame by releasable adhesive or latches.

15 Claims, 4 Drawing Sheets

SCREEN PROTECTOR

FIELD OF INVENTION

The present invention relates to protective devices and more particularly to a protective device sized to extend over a cathode ray or liquid crystal video screen to protect that screen from fracture due to impact damage.

BACKGROUND OF THE INVENTION

It is well known that there has been a substantial increase in the use of video screens and preferably liquid crystal screens in the current high technology consumer market. With specific reference to the increased use of video display screens for laptop computers, automotive, marine and aircraft satellite navigation units, the industry has moved toward the use of liquid crystal screens to enable reducing the overall size and weight of products. Although this flat screen technology can afford great benefit, the construction of this screen leaves it extremely fragile and vulnerable to impact damage. Moreover, the display screen may be the single most expensive component in a portable system, often costing $1,000 or more. Additionally, it may be more economical to replace an entire computer than to have a broken screen replaced. The change in the application and environment of the video screen has created a need for a device that can protect the screen from inadvertent damage, while not interfering with the operation of these products.

SUMMARY OF THE INVENTION

The present invention relates generally to the field of protector shields, and more particularly to a type of shield which will protect liquid crystal video screens from damage due to impact forces. The design criteria of this invention will not permit the protector to make contact with the screen at any point and by design will effectively transfer impact forces to the structure surrounding the screen. This invention makes use of strength available in the housing or finished material surrounding or supporting the video screen. This protector can be affixed to the housing or support structure using a releasable adhesive or a fastener that will not produce any deleterious effect to the product at the bond or attach points.

The protector is preferably fabricated from a clear Plexiglass® or Lucite® acrylic or Lexan® grade plastic and can be produced by the injection mold process although a variety of transparent materials can be used including glass. The protector is flat or curved and thickness may vary based on the application requirements. The body of the protector is to be recessed in the electronic device and may fit flush with the surface of the material surrounding the screen. The protector is recessed by sizing it to fit in the opening in the housing around the screen and making use of the existing angle or taper available on the screen surround or support structure to gain a fit that will not interfere with the operation of the unit. When an existing angle or taper is not available, a plurality of support tabs can be added to the protector, enabling the protector to transfer shock forces to the surround or housing that provides a border for the video screen. The protector uses a non permanent adhesive and/or mechanical latch to aid in fastening. When removal is required, the protector will release without damaging the surface at the bond point.

BRIEF DESCRIPTION OF THE DRAWINGS

These and other features of the present invention will become more apparent upon reference to the drawings wherein.

DESCRIPTION OF PREFERRED EMBODIMENTS

Figure 1:
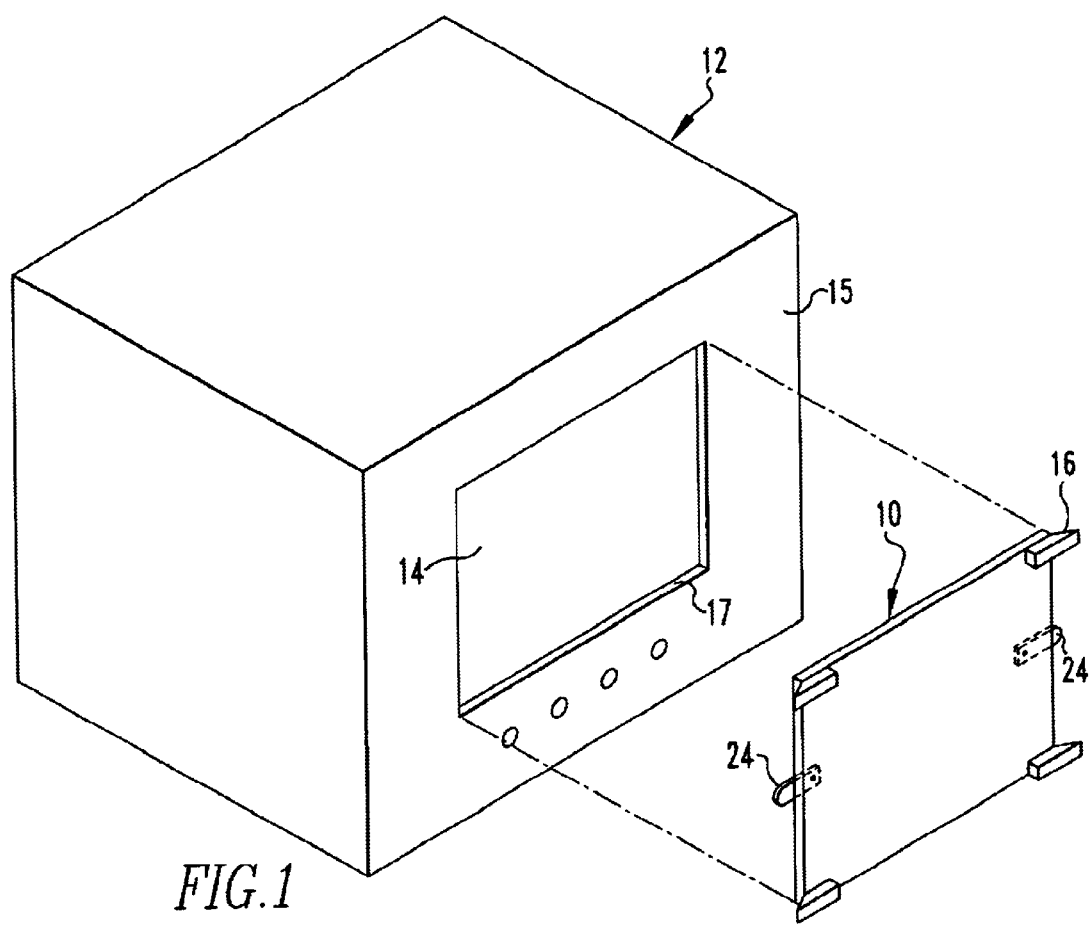
FIG. 1 is a perspective view of an electronic device and a screen protector of this invention ready for assembly with the electronic device.

FIG. 1 shows a typical electronic device 12 having a video screen 14 in it that can be beneficially protected by a screen protector 10 of this invention. The electronic device 12 may be a variety of things such as aircraft, automotive or marine units or computers such as laptops or small hand held devices. Many of these devices have fragile display screens such as liquid crystal screens or the like. The screens are extremely vulnerable to damage, especially when disposed horizontally or at an angle to vertical such that falling objects can impact and break them.

The screen 14 in device 12 has a housing 15 around it and the screen is recessed in the housing. The housing 15 includes a border 17 that frames the screen 14 on all four sides of the screen. The border 17 may be substantially perpendicular to the plane of the screen or may be tapered inwardly toward the center of the screen at an angle less than 90°, such as about 35–75°.

In accordance with this invention, the protector 10 includes a transparent screen or shield element 11 having peripheral dimensions approximately the same as the peripheral dimensions of the screen but less than the peripheral dimensions of the border 17. Thus the protector 10 can be recessed into the housing and will cover and protect the screen. It is important that the protector 10 be easily removable in order to clean the protected screen 14. The shield 11 is preferably made of transparent, substantially rigid plastic sheet material such as Plexiglas® or Lucite® acrylic material. The embodiment of the protector 10 shown in FIG. 1 has tabs 16 at the corners of the shield 11 for engaging the border 17 on the housing 15 to secure the protector in the housing 15 with the shield 11 spaced from the screen 14 as is described below. The protector 10 may also optionally include latches 24 as are also described below.

Figure 2:
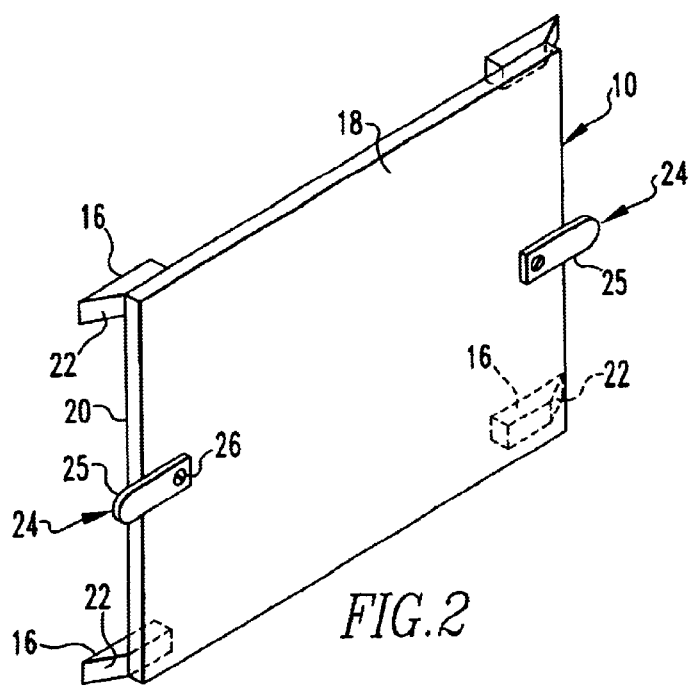
FIG. 2 is a perspective view of one embodiment of a screen protector of this invention.

FIG. 2 is a larger perspective of the protector 10 of FIG. 1 to better show the tabs 16 and latches 24 on the protector. The shield 11 has an inner or screenside face 18 for disposition toward a screen on an electronic device, and an outer face 20 opposite the inner face 18. The shield 11 is shown as planar, but may also be contoured to be essentially the same contour as an underlying display screen. The shield 11 is transparent, but may be tinted if desired. The shield 11 is also substantially rigid so that it will not be deflected into contact with a display screen by impact forces.

The protector 10 selected for illustration is rectangular and has support tab 16 permanently secured on the outer face 20 of the shield element 11 at each corner of the shield. The tabs 16 are also preferably transparent (plastic) to minimize possible interference with visibility of the screen on an electronic device. Each tab 16 preferably has a tapered or angled surface 22 for engaging against a border such as border 17 on the device 12 of FIG. 1. The tabs also preferably have a non-permanent adhesive on each of the tapered surfaces 22 for holding the protector in place on the housing of an electronic device. One example of a non-permanent adhesive is Aleene's "Tack-IT Over & Over"™, which is sold by Duncan Enterprises in Fresno, Calif.

Figure 3:
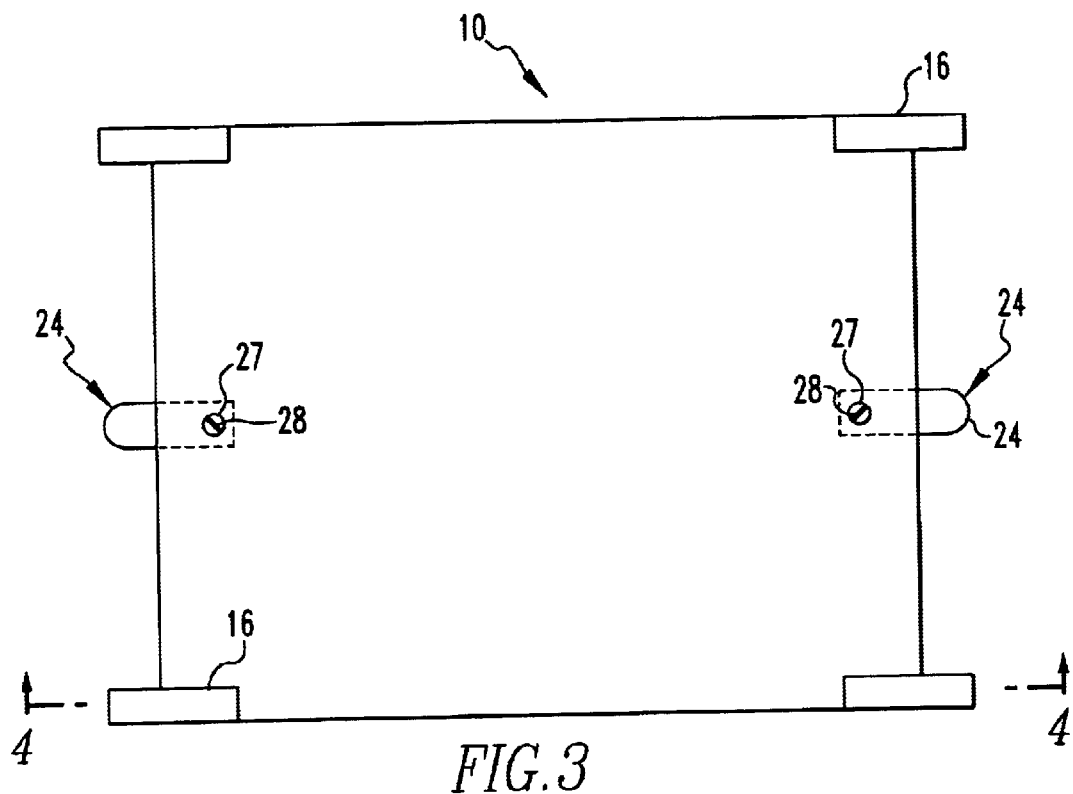
FIG. 3 is a plan view of the screen protector of FIG. 2.
Figure 4:
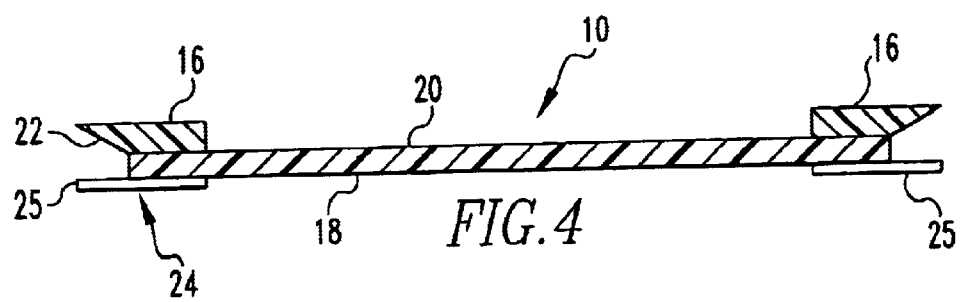
FIG. 4 is a cross-sectional view of the screen protector of FIGS. 2 and 3 taken along line 4—4 of FIG. 3.

The protector 10 may optionally also include movable or fixed latches 24 for engagement with the border on a housing to further secure the protector recessed in the housing (FIGS. 2–4). The latches 24 may include a rotatable shaft portion 26 fitted in a hole in the protector 10 and a thin plastic blade portion 25 for fitting into a recess in or contiguous to, the border 17 around the screen 14. The shaft portion has a head portion 27 on it with a slot 28 (FIG. 2) or Phillips recess in the head for receiving the blade of a screwdriver to rotate the shaft portion 26 and the latch 24. The latches 24 are preferably made of transparent plastic material that minimize any possible adverse effects on visibility of a display screen on which the protector 10 is used. One or both latches 24 on the protector 10 may alternatively be permanently affixed to the protector instead of being moveable. Such a fixed latch or latches 24 preferably comprise thin, transparent, flexible material bonded to the inner face of the screen protection 10 as with a resin bond adhesive or a weld bond. The flexible material may be about 0.025 inch thick so it can be flexed into and out of engagement under the border around the display screen.

Figure 5:
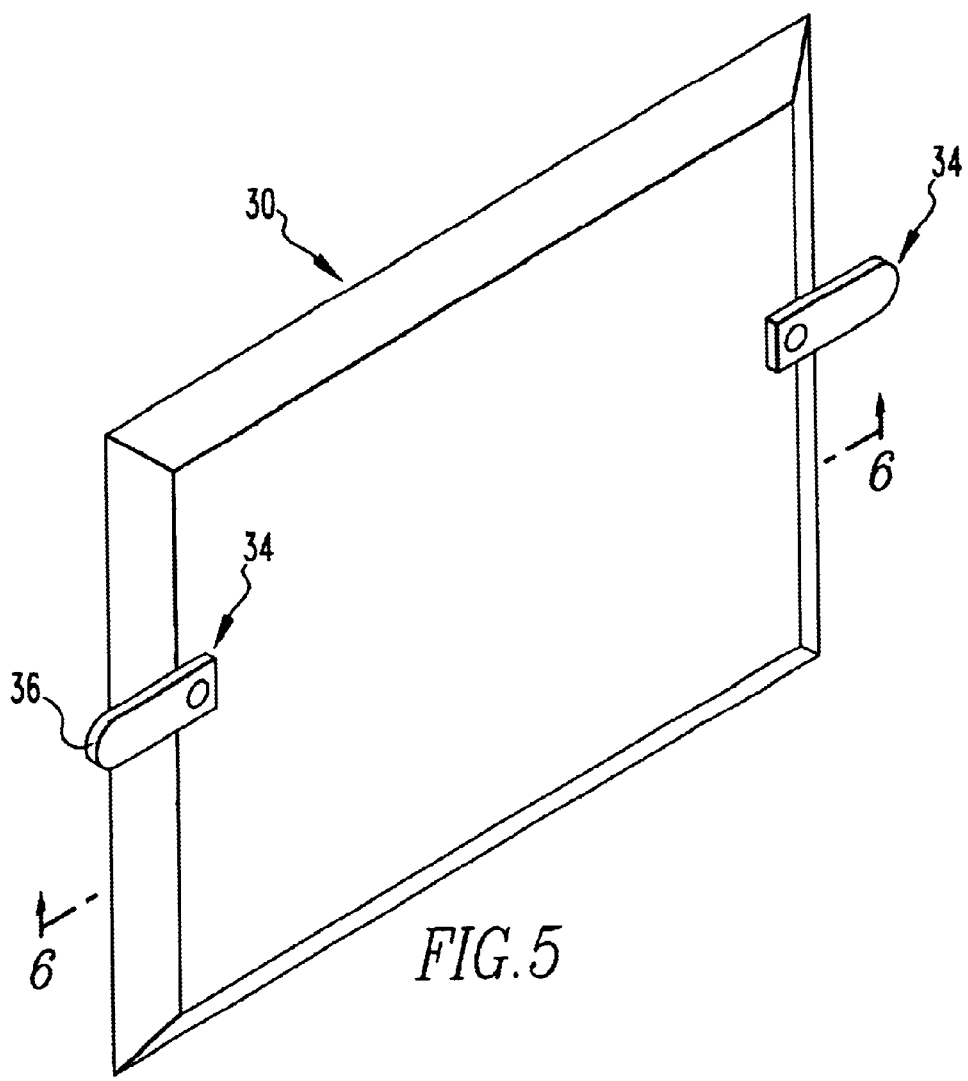
FIG. 5 is a perspective view of an alternative embodiment of a screen protector of this invention.
Figure 6:
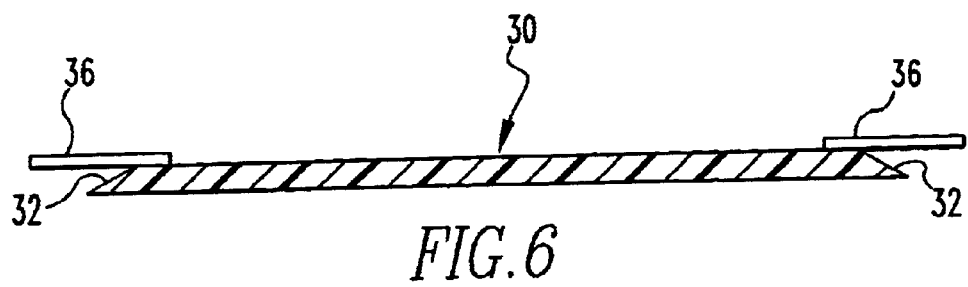
FIG. 6 is a cross-sectional view of the screen protector of FIG. 5 taken along line 6—6 in FIG. 5.

FIGS. 5 and 6 show an alternative embodiment of a protector 30 that has tapered edges 32 for engaging against similarly tapered edges on the housing border around a display screen. The tapered edges 32 may be on all four sides of the protector 30 or may alternatively just be on two opposed edges such as side edges or on the upper and lower edges. The angle of taper of the edges 32 is preferably about the same as the taper on the border of the housing on which the protector 10 is to be used.

The protector 30 also preferably has non-permanent adhesive on the edges 32 and may optionally further include movable or fixed latches 34 on the inner surface of the protector. The latches 34 are essentially the same as latches 24 on the embodiment of FIGS. 2–4, and include blade portions 36 that are preferably on the face of the protector that will face the display screen on which the protector is to be used.

Figure 7:
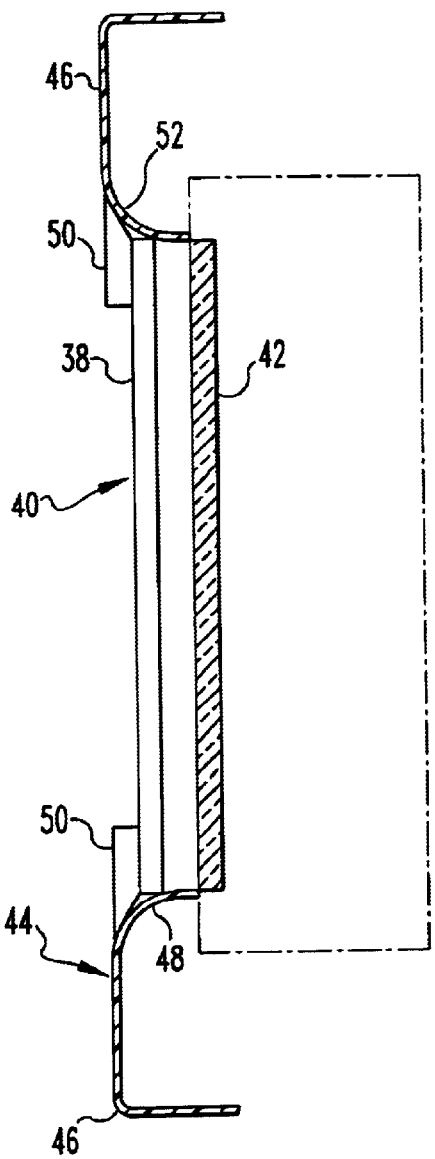
FIG. 7 is a fragmentary cross-sectional view through a screen protector of this invention removably secured to a housing over a display screen.

FIG. 7 is a cross-section through protector 40 of this invention removably secured over a display screen 42 on an electronic device 44. The device includes a housing 46 with an opening in it through which the screen 42 is seen. The housing 46 has a border, 48 that frames the screen 42, and against which the protector 40 is secured. The border 48 is substantially perpendicular to the screen, but could also be tapered inwardly toward the center of the screen. The protector 40 includes a transparent shield 38 and has tabs 50 permanently secured to its outer surface of the shield for engagement against the border 48. The tabs 50 are preferably located on the four corners of the protector 40. The tabs 50 have tapered edges 52 on them for engaging the housing 46 and preferably has releasable adhesive on such tapered edges. The protector 40 may also include movable or fixed, flexible latches, not shown, similar to the latches 24, 34 shown in FIGS. 2–4. The flexible latches would preferably be bonded to the inner face of the protector 40 on both side edges of the protector.

Figure 8:
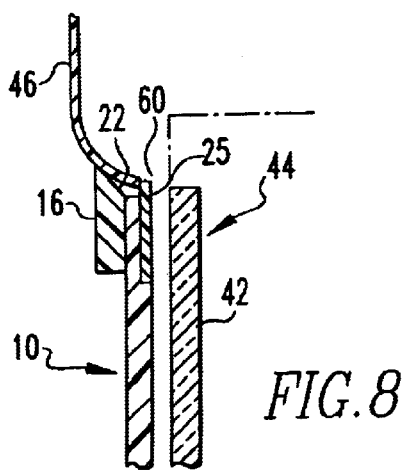
FIG. 8 is an enlarged fragmentary cross-sectional view showing engagement of a latch or a screen protector of this invention engaged with a housing on an electronic device.

FIG. 8 is an enlarged fragmentary view of a latch 24 on screen protector of FIGS. 2–4 engaged in a recess 60 between the housing 46 around screen 42 on the electrical device 44. Many electronic devices, such as device 44, include inwardly projecting edge portions on the housings around their video screens leaving a recess or channel 60 into which the blade portion 25 on the latch 24 can be rotated to hold the protector 10 securely on the electronic device. The blade portion 25 of the latch 24 is relatively thin, such as about 0.025 to 0.0125 inch so the blade portion can fit into the recess or channel 60 between the edge of the screen 42 and the housing 46.

In accordance with this invention, protectors such as 10, 30 and 40 are designed to be recessed in the housings around display screen. Depending on the device, the border on the housing may be approximately 1/32 to 1/2 or more in perpendicular extent from the screen, and the protector may be spaced approximately 1/16 to 1/8 inch from the screen. The protector may have a thickness of approximately 1/32 to 1/4. However, such dimensions are not limiting of this invention. Protectors of this invention are particularly sized to recess into the opening in the housing around the screen of the particular electronic device on which the protector is to be used. It is important that protectors of this invention be sized so the protector shield does not contact the display screen on the electronic device. Thus the impact of an object striking the protector will not be transferred to the display screen.

It is therefore seen that this invention provides a convenient and inexpensive device for protecting display screens or electronic devices. The preferred embodiments have been selected for illustration and teaching the invention and are not limiting of the invention. It will be apparent to those knowledgeable in the art that numerous modifications can be made to the preferred embodiments without departing from the invention or the scope of the claims appended hereto.

For example, the protector could have one fixed latch and one rotating latch instead of two rotating latches, or could have one or two slideable latches instead of the rotatable latch. The rotatable latch could also have a threaded shaft instead of a smooth cylindrical shaft. The protector can have a great variety of shapes and dimensions depending on the size and shape of the electronic device on which the protector is to be used.

What is claimed:

1. A frameless screen protector for a display on an electronic device having a housing having a an opening therein for viewing said display screen with said display screen recessed in said opening and said housing having an outer face and a border around said display screen disposed at an angle to the screen, said screen protector comprising:

a rigid, transparent protector screen made of plastic material having substantially the same peripheral dimensions as said display screen and smaller than said opening in said housing so said protector screen can be recessed in said housing, said protector screen having an inner face for disposition toward said display screen and an outer face opposite said inner face;

support means on said protector screen for engagement against said border on said housing and supporting said protector screen spaced from said display screen, said support means comprises a plurality of support tabs permanently secured to said protector screen near the edges of the screen and projecting outwardly from said edges for engagement against said border; and means for releasably securing said protector screen to said border.

2. A screen protector as set forth in claim 1 in which each of said tabs has a beveled surface for engaging against said border on said housing.

3. A screen protector as set forth in claim 2 in which said beveled surface on each said tab has a releasable adhesive on it for removably securing said protector screen to said housing.

4. A screen protector as set forth in claim 1 in which said protector screen has a peripheral edge therearound and said peripheral edge has at least a portion thereof beveled outwardly from said inner surface to said outer surface for engaging against a mating beveled surface on said housing.

5. A screen protector as set forth in claim 1 which includes at least two latches for engagement against said border to removably secure said protector screen and said electronic device.

6. A screen protector as set forth in claim 5 in which at least one of said at least two latches is movable into engagement between said display screen and said border.

7. A screen protector as set forth in claim 5 in which each of said at least two latches is permanently affixed to said protector screen and comprises a flexible blade portion for engagement into a recess between said display screen and said border.

8. A screen protector as set forth in claim 1 which is made of acrylic plastic material.

9. A screen protector as set forth in claim 1 which is rectangular with four corners and has one of said tabs secured on each such corner.

10. A screen protector as set forth in claim 4 which includes releasable adhesive on said peripheral edge.

11. A frameless screen protector for a fragile substantially planar display screen on an electronic device, said electronic device having a housing forming an opening in said electronic device with said display screen recessed in said housing, said screen protector comprising:

a rigid transparent protector screen having substantially the same peripheral dimensions as said display screen and smaller than said opening formed by said housing for said protector screen to be positioned in said opening, said protector screen has a peripheral edge and said peripheral edge is beveled for engagement against a mating surface on said housing and supporting the protector screen spaced from the display screen on said electronic device, and releasable adhesive on said protector screen for removably securing said protector screen to said housing spaced from said display screen.

12. A screen protector as set forth in claim 11 which includes a plurality of support tabs permanently secured to the periphery of said screen protector, each of said tabs having a releasable adhesive on it for releasably securing said screen protector to said housing.

13. A screen protector as set forth in claim 11 in which said beveled edge has a releasable adhesive on it.

14. A screen protector as set forth in claim 11 that has movable latches on it for engagement against said housing around said opening therein.

15. A screen protector as set forth in claim 11 that has at least two flexible latches permanently affixed to said screen protector for engagement under said housing around said display screen.

* * * * *